W. W. SMALLEY.
Journal-Bearing.
No. 209,084. Patented Oct. 15, 1878.
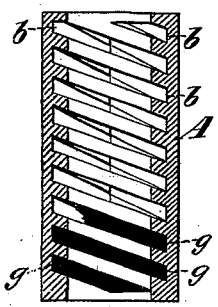
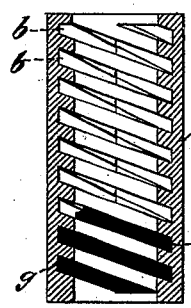
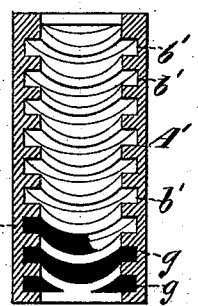
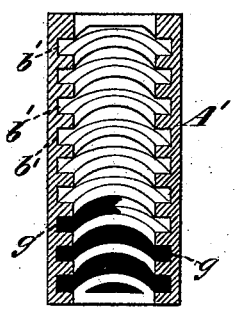
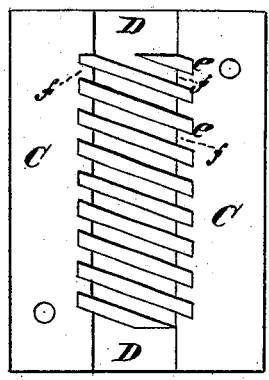
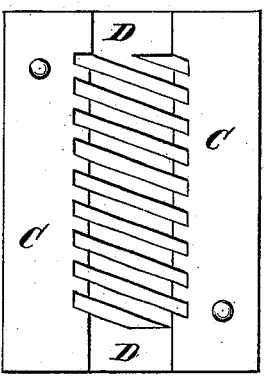
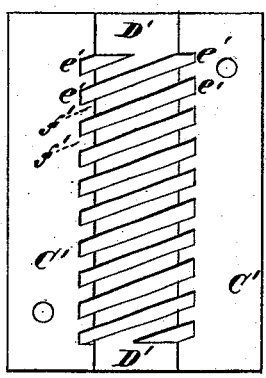
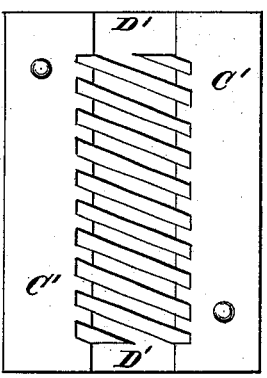
Witnesses
John Becker
Inventor
W. W. Smalley

UNITED STATES PATENT OFFICE.

WILLIAM W. SMALLEY, OF BOUND BROOK, NEW JERSEY, ASSIGNOR TO JOHN SMALLEY, OF SAME PLACE.

IMPROVEMENT IN JOURNAL-BEARINGS.

Specification forming part of Letters Patent No. 209,084, dated October 15, 1878; application filed June 8, 1878.

*To all whom it may concern:*

Be it known that I, WILLIAM W. SMALLEY, of Bound Brook, in the county of Somerset and State of New Jersey, have invented an Improvement in Bearings for Journals of Shafting, &c.; and I do hereby declare that the following is a full, clear, and exact description of the same, reference being had to the accompanying drawings, forming a part of this specification.

My invention relates to that class of journal-bearings in which provision is made for the retention therein of solid or plastic lubricating material, but which may also contain porous solid substances, for retaining liquid lubricating materials by their capillary action.

The invention consists in a journal-bearing surrounded by a groove or grooves formed on the interior of the said bearing, and inclined to the longitudinal axis of the said bearing, by which the following advantages are secured: There is always, in every position of the shaft or journal revolving in the said bearing, solid metal for supporting the weight of the shaft, while at the same time the said journal is, in every part, brought into intimate contact with the lubricating material at every revolution. Moreover, the said inclined position of the groove or grooves relatively to the axis of revolution of the shaft or the journal in said bearing acts to carry out or to force out of or off from the said bearing-surface any dirt or extraneous matters that may accidentally find their way into the said bearing or onto the bearing-surface, thereby keeping the said bearing free from anything that might tend to increase the friction therein.

The said journal-bearing may be made in parts, as in the ordinary way of casting journal-boxes, or it may be formed in a single piece.

The invention will be sufficiently illustrated by a description thereof as formed in a single piece.

Figures 1 and 2 in the drawings represent, respectively, halves of a journal-bearing which is formed by casting in a single piece. Figs. 3 and 4 represent, respectively, the two halves of the core-box employed to form the core for casting the said bearing, and which will be referred to in the description of the same. Figs. 5 and 6 represent, respectively, halves of a journal-bearing formed in a single piece in a modified way of carrying out my invention. Figs. 7 and 8 represent, respectively, the core-box used to make the core for casting the said modified form of the said bearing.

The said halves of each of the said bearings are such as would be formed by a section through the same at right angles with the plane on which its proper core-box divides to draw the core from the said box.

The cores employed in the casting of the bearings are of the kind known as "green-sand" cores.

The form of bearing that I prefer is shown in Figs. 1 and 2. In this bearing there are one or more spiral grooves, $b$, extending the entire length of the said bearing. The said spiral groove or grooves somewhat resemble screw-threads; but they are not screw-threads, being formed in such manner that the core over which the same are cast may be drawn from the core-box C, Figs. 3 and 4, in which figures D represents the core-prints, $e$ represents parts or plane-sided grooves of the core-box which form the projections on the core for the formation of the grooves $b$, and $f$ represents the parts intervening. This form of the core-box enables the core to be drawn from the core-box, which could not be done with a regular screw-thread, as the sides of the groove $e$ in the said parts of the core-box are planes inclined to the longitudinal axis of said box.

In the modified way of carrying out my invention shown in Figs. 5 and 6, the grooves do not extend the whole length of the bearing, but are formed obliquely to the central longitudinal axis of the bearing, a central section through any of the said grooves parallel to the side thereof being an ellipse, having dimensions the same as if formed by cutting a cylinder of the same diameter as the shortest diameter of the said ellipse by a plane inclined to the longitudinal axis of the said cylinder in the same angle. The said bearing is cast in one piece over a core made in a core-box, C'. (Represented in Figs. 7 and 8, in which D' represents the core-prints, $e'$ represents the parts of the said core-box which form the projections on the core over which the said grooves are cast, and $f'$ the intervening parts.)

It will be seen that the two core-boxes C and C' are similar, except that in the core-box C the parts $e$ and $f$ are inclined in the same direction in both parts of the said core-box when separated and opened, as shown in the drawings, and that the parts $e'$ and $f'$ in the core-box C' are inclined in opposite directions in the two parts of the said core-box when the same are separated and placed as shown in the drawings.

The core-box C forms a core for the casting of a groove that will extend the whole length of the bearing, and the core-box C' forms a core for the casting of the parallel inclined grooves $b'$ in the modification of the invention shown in Figs. 5 and 6.

In the said grooves I place the plastic or solid lubricating material, or a porous substance for holding a liquid lubricating material, as shown at $g$, Figs. 1, 2, 5, and 6.

By this construction of the bearing I am able to support a journal on metal at the bottom and at all parts of its periphery—that is to say, there is no line in the bearing-surface parallel to the axis of the said journal that can at any time bear wholly against or upon a surface of lubricating material. Every part of the surface of the journal must pass over and be lubricated by the said lubricating material at each revolution of the said journal. The form of the said grooves is, moreover, well suited to holding any solid or plastic lubricating material.

The common feature of the grooves in both the forms of the bearings shown and described is that the sides of the said grooves are plane surfaces, or made up of plane surfaces, inclined to the longitudinal axis of the bearing.

I claim—

1. A metal journal-bearing having an internal groove or grooves the sides of which are planes, or made up of plane surfaces inclined to the longitudinal axis of the said bearing, for the reception of lubricating material, substantially as and for the purpose specified.

2. The combination, with a metal journal-bearing having an internal groove or grooves inclined to the longitudinal axis of the said bearing, of solid or plastic lubricating material inserted and held in the said groove or grooves, substantially as and for the purpose described.

W. W. SMALLEY.

Witnesses:
CHAS. B. JESSUP,
T. J. KEANE.